United States Patent
Ku et al.

(10) Patent No.: US 10,819,450 B2
(45) Date of Patent: Oct. 27, 2020

(54) METHOD BY WHICH TERMINAL PERFORMS FREQUENCY MEASUREMENT, AND DEVICE

(71) Applicant: LG ELECTRONICS INC., Seoul (KR)

(72) Inventors: Gwanmo Ku, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 15/773,971

(22) PCT Filed: Oct. 26, 2016

(86) PCT No.: PCT/KR2016/012037
§ 371 (c)(1),
(2) Date: May 4, 2018

(87) PCT Pub. No.: WO2017/078316
PCT Pub. Date: May 11, 2017

(65) Prior Publication Data
US 2018/0323884 A1 Nov. 8, 2018

Related U.S. Application Data

(60) Provisional application No. 62/251,656, filed on Nov. 5, 2015.

(51) Int. Cl.
*H04B 17/318* (2015.01)
*H04W 36/00* (2009.01)
(Continued)

(52) U.S. Cl.
CPC ............ *H04B 17/318* (2015.01); *H04W 4/70* (2018.02); *H04W 24/08* (2013.01); *H04W 36/0085* (2018.08); *H04W 48/16* (2013.01)

(58) Field of Classification Search
None
See application file for complete search history.

(56) References Cited

U.S. PATENT DOCUMENTS

2012/0322440 A1   12/2012   Jeong et al.
2013/0088985 A1   4/2013    Park et al.
(Continued)

FOREIGN PATENT DOCUMENTS

WO    2008157573    12/2008

OTHER PUBLICATIONS

PCT International Application No. PCT/KR2016/012037, Written Opinion of the International Searching Authority dated Jan. 25, 2017, 6 pages.

*Primary Examiner* — Alex Skripnikov
(74) *Attorney, Agent, or Firm* — Lee, Hong, Degerman, Kang & Waimey

(57) ABSTRACT

A method by which a terminal performs frequency measurement in a wireless communication system, and a device for supporting the same are provided. The terminal receives an intra-frequency measurement threshold value and an inter-frequency measurement threshold value for a reduced performance measurement group, measures a signal level of a serving cell, and performs frequency measurement on the basis of the measured signal level of the serving cell and the received threshold values, wherein the intra-frequency measurement threshold value can be larger than the inter-frequency measurement threshold value for the reduced performance measurement group.

13 Claims, 10 Drawing Sheets

(51) Int. Cl.
*H04W 48/16* (2009.01)
*H04W 24/08* (2009.01)
*H04W 4/70* (2018.01)

(56) References Cited

U.S. PATENT DOCUMENTS

| | | |
|---|---|---|
| 2013/0188503 A1 | 7/2013 | Anepu et al. |
| 2014/0355473 A1 | 12/2014 | Edara |
| 2016/0081020 A1* | 3/2016 | Rahman ............ H04W 52/0209 370/311 |
| 2016/0262077 A1* | 9/2016 | Zhang ................... H04W 24/08 |

* cited by examiner

METHOD BY WHICH TERMINAL PERFORMS FREQUENCY MEASUREMENT, AND DEVICE

CROSS-REFERENCE TO RELATED APPLICATIONS

This application is the National Stage filing under 35 U.S.C. 371 of International Application No. PCT/KR2016/012037, filed on Oct. 26, 2016, which claims the benefit of U.S. Provisional Application No. 62/251,656, filed on Nov. 5, 2015, the contents of which are all hereby incorporated by reference herein in their entirety.

BACKGROUND OF THE INVENTION

Field of the Invention

The present invention relates to a wireless communication system and, more particularly, to a method for performing, by a UE, frequency measurement, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine-Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

SUMMARY OF THE INVENTION

One of the important factors for MTC UEs is power consumption. That is, an MTC UE may need an efficient frequency measurement method for detecting a better cell while minimizing power consumption. Inter-frequency measurement requires not only frequent measurement, compared to intra-frequency measurement, but also additional power consumption to tune a radio frequency to a target frequency. Therefore, it is necessary to newly propose an inter-frequency measurement method of an MTC UE and a device supporting the same.

According to an embodiment, there is provided a method for performing, by a user equipment (UE), frequency measurement in a wireless communication system. The UE may include: receiving an intra-frequency measurement threshold value and an inter-frequency measurement threshold value for a reduced performance measurement group; measuring a signal level of a serving cell; and performing frequency measurement on the basis of the measured signal level of the serving cell and the received threshold values, wherein the intra-frequency measurement threshold value may be greater than the inter-frequency measurement threshold value for the reduced performance measurement group.

When the measured signal level of the serving cell is smaller than the inter-frequency measurement threshold value for the reduced performance measurement group, the frequency measurement may be reduced inter-frequency measurement. The reduced inter-frequency measurement may require a smaller number of samplings for frequency measurement than normal inter-frequency measurement.

The signal level of the serving cell may be at least any one of a power of the serving cell and a quality of the serving cell.

The UE may be an MTC UE.

The UE may further include receiving an inter-frequency measurement threshold value for a normal performance measurement group, wherein the inter-frequency measurement threshold value for the reduced performance measurement group is greater than the inter-frequency measurement threshold value for the normal performance measurement group.

When the measured signal level of the serving cell is smaller than the inter-frequency measurement threshold value for the reduced performance measurement group and is greater than the inter-frequency measurement threshold value for the normal performance measurement group, the frequency measurement may be reduced inter-frequency measurement. The reduced inter-frequency measurement may require a smaller number of samplings for frequency measurement than normal inter-frequency measurement.

When the measured signal level of the serving cell is smaller than the inter-frequency measurement threshold value for the normal performance measurement group, the frequency measurement may be normal inter-frequency measurement.

The intra-frequency measurement threshold value and the inter-frequency measurement threshold value for the reduced performance measurement group may be broadcast from a network.

According to another embodiment, there is provided a UE for performing frequency measurement in a wireless communication system. The UE may include: a memory; a transceiver; and a processor to connect the memory and the transceiver, wherein the processor may be configured to: control the transceiver to receive an intra-frequency measurement threshold value and an inter-frequency measurement threshold value for a reduced performance measurement group; measure a signal level of a serving cell; and perform frequency measurement on the basis of the measured signal level of the serving cell and the received threshold values, and the intra-frequency measurement threshold value may be greater than the inter-frequency measurement threshold value for the reduced performance measurement group.

It is possible to efficiently perform frequency measurement.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
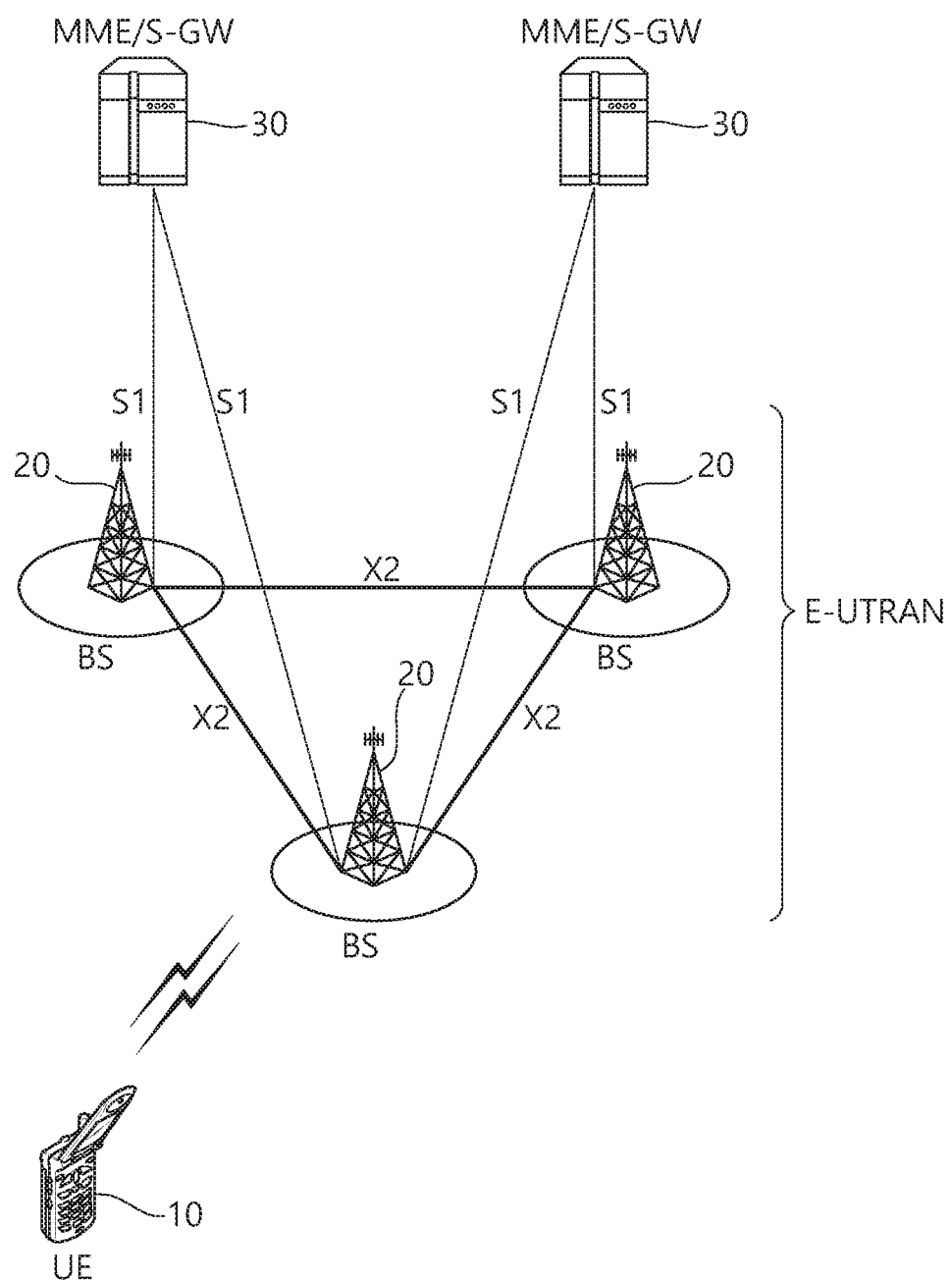
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurement, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
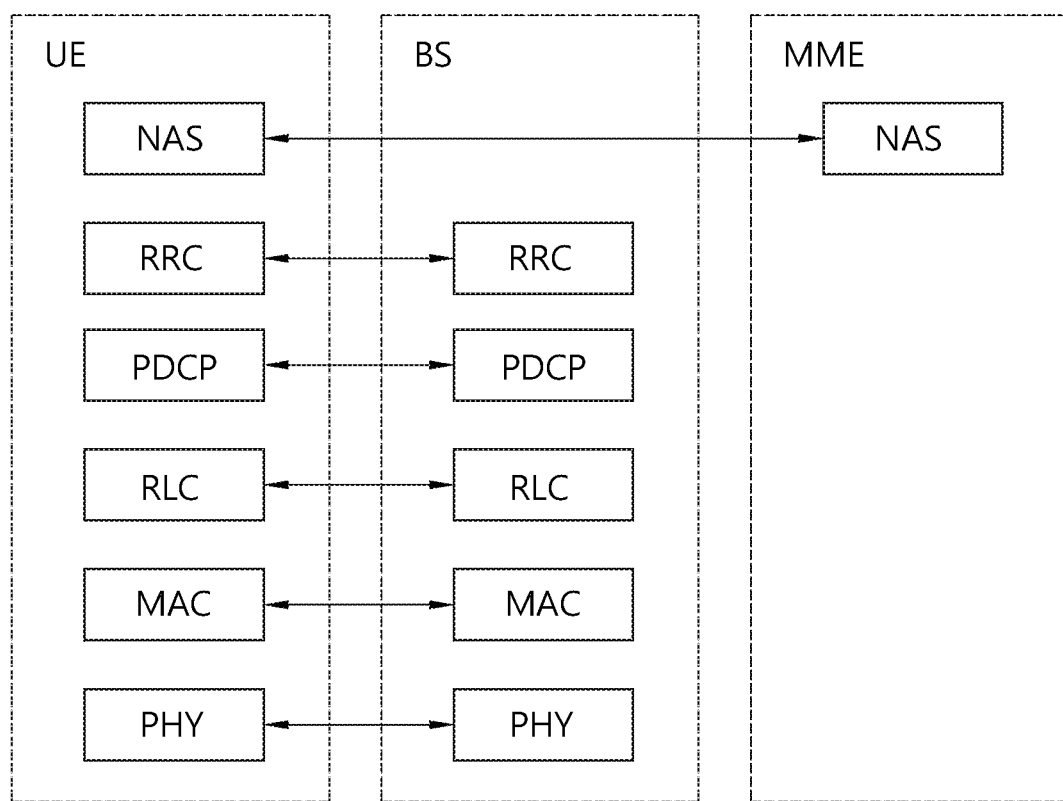
FIG. 2 shows a control plane of a radio interface protocol of an LTE system.
Figure 3:
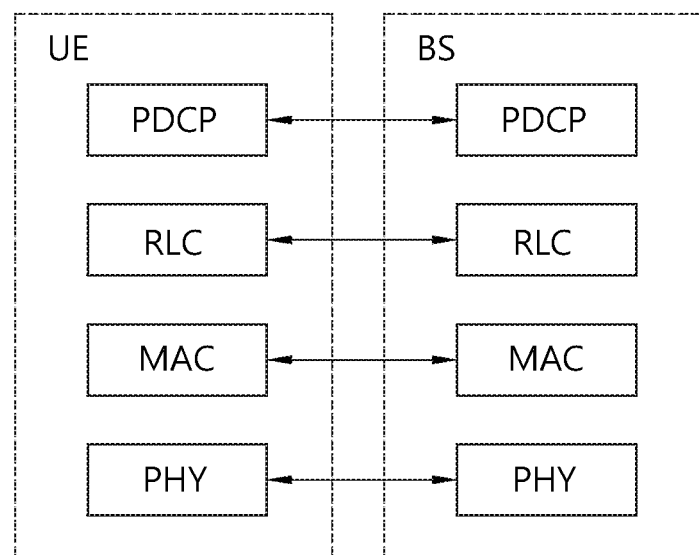
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of manipulating a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurement for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
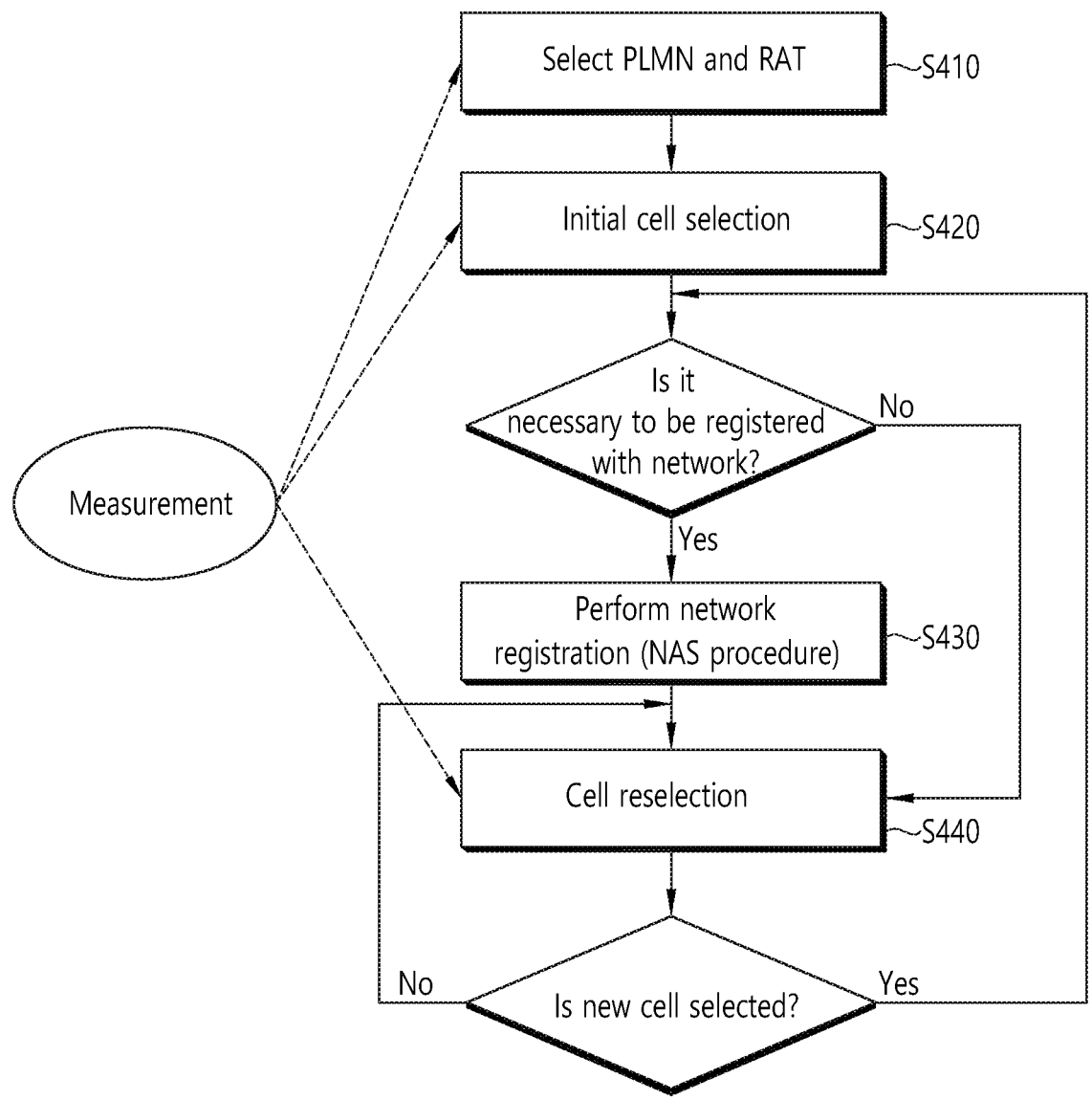
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighbor cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Hereinafter, a Method and a Procedure of Selecting a Cell by a UE in a 3GPP LTE is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurement of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighbor Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking Performed in a Cell Reselection Evaluation Process is Described Below.

A ranking criterion used to apply priority to a cell is defined as in Equation 1.

$$R_s = Q_{meos,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Hereinafter, a Cell Selection Criterion S will be Described.

A UE may calculate the ranking of any cell satisfying a cell selection criterion S. The cell selection criterion may be defined by Equation 2.

$$\text{Srxlev} > 0 \text{ and } \text{Squal} > 0 \qquad \text{[Equation 2]}$$

Srxlev denotes a cell selection RX level value (dB), which may be defined by Equation 3. Squal denotes a cell selection quality value (dB), which may be defined by Equation 4.

$$\text{Srxlev} = \text{Qrxlevmeas} - (\text{Qrxlevmin} + \text{Qrxlevminoffset}) - \text{Pcomposation} - \text{Qoffsettem} \qquad \text{[Equation 3]}$$

Qrxlevmeas denotes a downlink reception power value used when the UE actually measures an RX channel, Qrxlevmin denotes a minimum downlink receiver power requirement level required to select a corresponding cell, Qrxlevminoffset denotes a threshold value to be added to Qrxlevmin only when the UE periodically searches for a public land mobile network (PLMN, or a communication vendor) having a higher priority while being present in a visited public land mobile network (VPLMN), Pcompensation is a threshold value considering an uplink channel state, and Qoffsettemp is an offset temporarily applied to the cell.

$$\text{Squal} = \text{Qqualmeas} - (\text{Qqualmin} + \text{Qqualminoffset}) - \text{Qoffsettemp} \qquad \text{[Equation 4]}$$

Qqualmeas denotes a value obtained by calculating a ratio of received signal strength used when the UE actually measures a downlink RX channel and total noise actually measured. Qqualmin a minimum signal to noise ratio level required to select a corresponding cell. Qqualminoffset denotes a threshold value to be added to Qqualmin only when the UE periodically searches for a PLMN having a higher priority while being present in a VPLMN, and Qoffsettemp is an offset temporarily applied to the cell.

Referring to Equation 2 above, the cell selection criterion may be satisfied when both of Srxlev and Squal are greater than 0. That is, when both of the RSRP and RSRQ of the measured cell are greater than or equal to a specific level, the UE may determine the cell as a cell having a basic possibility for cell reselection. In particular, Squal is a parameter corresponding to the RSRQ. That is, Squal is a value calculated in association with quality of power rather than simply a value associated with a magnitude of power measured in the cell. The cell selection criterion may be satisfied in terms of quality of the cell if Squal>0. The cell selection criterion for the RSRQ may be satisfied only when the measured RSRQ is greater than or equal to a sum of Qqualmin and Qqualminoffset.

Hereinafter, Measurement Rules for Cell Reselection will be Described.

When evaluating the quality value (Srxlev and Squal) of a cell to be measured for reselection purposes, a UE may use a parameter provided by a serving cell. The following rules are used by a UE to limit measurement for cell reselection.

(1) When the quality value (Srxlev and Squal) of a serving cell exceeds a threshold value (SIntraSearchP and SIntraSearchQ), the UE may not perform intra-frequency measurement. That is, when Srxlev of the serving cell exceeds a threshold value (SIntraSearchP) and Squal of the serving cell exceeds a threshold value (SIntraSearchQ), the UE may not perform intra-frequency measurement. Otherwise, the UE may perform intra-frequency measurement.

(2) For an E-UTRAN inter-frequency or inter-RAT frequency with a reselection priority that is higher than the reselection priority of the current E-UTRA frequency, the UE may perform measurement on an E-UTRAN inter-frequency or inter-RAT frequency of a higher priority regardless of the quality value of the serving cell.

(3) For an inter-RAT frequency with a reselection priority that is lower than the reselection priority of the current E-UTRAN frequency and for an E-UTRAN inter-frequency with a reselection priority that is equal to or lower than the reselection priority of the current E-UTRA frequency, the UE may operate as follows. When the quality value (Srxlev and Squal) of the serving cell exceeds a threshold value (SnonIntraSearchP and SnonIntraSearchQ), the UE may not perform measurement on an E-UTRAN inter-frequency or inter-RAT frequency cell of an equal or lower priority. That is, when Srxlev of the serving cell exceeds a threshold value (SnonIntraSearchP) and Squal of the serving cell exceeds a threshold value (SnonIntraSearchQ), the UE may not perform measurement on an E-UTRAN inter-frequency or inter-RAT frequency cell of an equal or lower priority. Otherwise, the UE may perform may not perform measurement on an E-UTRAN inter-frequency or inter-RAT frequency cell of an equal or lower priority.

Hereinafter, Machine-Type Communication (MT C) will be Described.

Figure 5:
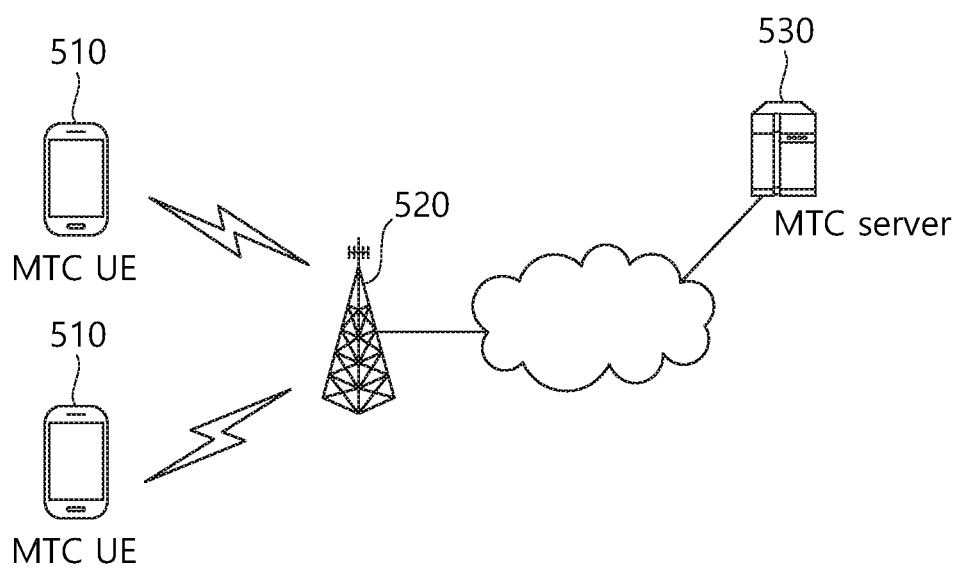
FIG. 5 shows an example of MTC.

FIG. 5 shows an example of MTC.

MTC refers to information exchange between MTC UEs 510 via a BS 520 without involving human interactions or information exchanges between an MTC UE 510 and an MTC server 530 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, a NB-IoT UE and a UE Category 0 UE may be used with the same meaning, and a normal UE may be used to refer to a UE other than the listed UEs.

The MTC server 530 is an entity communicating with the MTC UE 510. The MTC server 530 runs an MTC application and provides an MTC-specific service to an MTC device. The MTC UE 510 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 1 shows 3GPP UE categories.

TABLE 1

| UE Category | DL speed | UL speed |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

Meanwhile, MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Currently, for cell reselection, a UE may initiate the measurement of a neighbor cell when the signal level of a serving cell is lower than a specific threshold value or after several decoding failures. The specific threshold value may be at least any one of SIntraSearchP, SIntraSearchQ, SnonIntraSearchP, and SnonIntraSearchQ. The UE may be an MTC terminal. When the specific threshold value is set too high, the UE needs to measure the neighbor cell frequently. On the other hand, when the specific threshold value is set too low, the UE may need to be served by a poor-quality serving cell even if there is a better cell around the UE.

One of the important factors for MTC UEs is power consumption. That is, an MTC UE may need an efficient frequency measurement method for detecting a better cell while minimizing power consumption. Inter-frequency measurement requires not only frequent measurement, compared to intra-frequency measurement, but also additional power consumption to tune a radio frequency to a target frequency. Therefore, the best way for an MTC UE to save energy to find a better cell in the MTC terminal is to efficiently perform inter-frequency measurement.

Currently, in LTE, different types of intra-frequency measurement and inter-frequency measurement may be performed with different measurement requirements. The measurement requirements may include measurement accuracy or a measurement period. For example, measurement on a frequency of a higher priority, measurement on a frequency of the same or lower priority, measurement on a frequency belonging to a reduced performance measurement group, or measurement on a frequency belonging to a normal performance measurement group may be measured with different measurement requirements.

A strict measurement requirement may require greater power consumption. For example, the stringent measurement requirement may be applied to inter-frequency measurement for a normal performance measurement group, and power consumption for inter-frequency measurement for the normal performance measurement group may be greater than power consumption for inter-frequency measurement for a reduced performance measurement group.

Accordingly, an MTC UE may need to perform frequency measurement with power consumption minimized Therefore, it is necessary to propose a new frequency measurement method. Hereinafter, a method for a UE to perform frequency measurement and a device supporting the same will be described in detail according to to an embodiment of the present invention.

For a UE to efficiently perform neighbor cell measure, a plurality of threshold values for triggering neighbor cell measurement needs to be proposed. The plurality of threshold values may be an intra-frequency measurement threshold value and an inter-frequency measurement threshold value for a reduced performance measurement group. Alternatively, the plurality of threshold values may be an intra-frequency measurement threshold value, an inter-frequency measurement threshold value for a reduced performance measurement group, and an inter-frequency measurement threshold value for a normal performance measurement group. The UE may be an MTC UE. The neighbor cell measurement may be at least any one of intra-frequency measurement, inter-frequency measurement for a reduced performance measurement group, and inter-frequency measurement for a normal performance measurement group. In the present specification, inter-frequency measurement for a reduced performance measurement group may be used with the same meaning as reduced inter-frequency measurement, and inter-frequency measurement for a normal performance measurement group may be used with the same meaning as normal inter-frequency measurement. Reduced inter-frequency measurement may require a smaller number of samplings for frequency measurement than normal inter-frequency measurement. Alternatively, reduced inter-frequency measurement may have a shorter measurement interval than normal inter-frequency measurement. Alternatively, reduced inter-frequency measurement may have a longer measurement period than the normal inter-frequency measurement.

Thus, reduced inter-frequency measurement may have smaller load than normal inter-frequency measurement.

Figure 6:
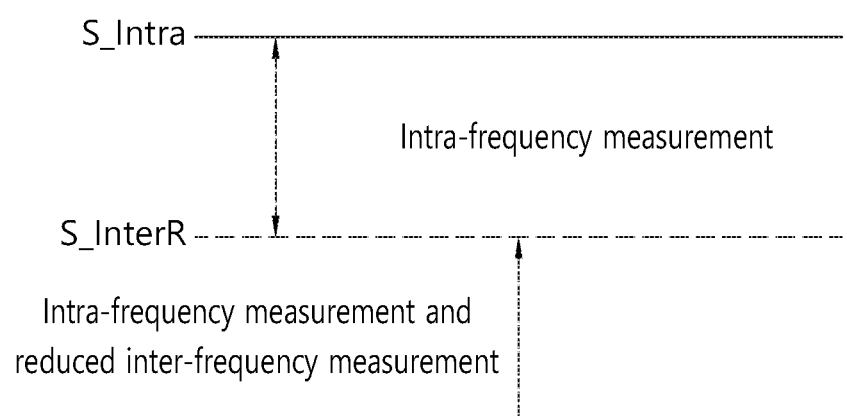
FIG. 6 shows an example of setting a plurality of threshold values according to an embodiment of the present invention.

FIG. 6 shows an example of setting a plurality of threshold values according to an embodiment of the present invention.

Referring to FIG. 6, S_Intra may be an intra-frequency measurement threshold value. S_InterR may be an inter-frequency measurement threshold value for a reduced performance measurement group. S may be the signal level of a serving cell. S_Intra may be greater than S_InterR.

When the signal level (S) of the serving cell measured by a UE is equal to or greater than S_Intra, the UE may not perform intra-frequency measurement and inter-frequency measurement. When the signal level (S) of the serving cell measured by the UE is smaller than S_Intra but is greater than S_InterR, the UE may need to perform intra-frequency measurement. When the signal level (S) of the serving cell measured by the UE is smaller than S_InterR, the UE may need to perform intra-frequency measurement and inter-frequency measurement for a reduced performance measurement group. The UE may be an MTC UE. The measured signal level (S) of the serving cell may be at least any one of the measured power of the serving cell and the measured quality of the serving cell. For example, the measured power of the serving cell may be reference signal received power (RSRP). For example, the measured quality of the serving cell may be reference symbol received quality (RSRQ).

Figure 7:
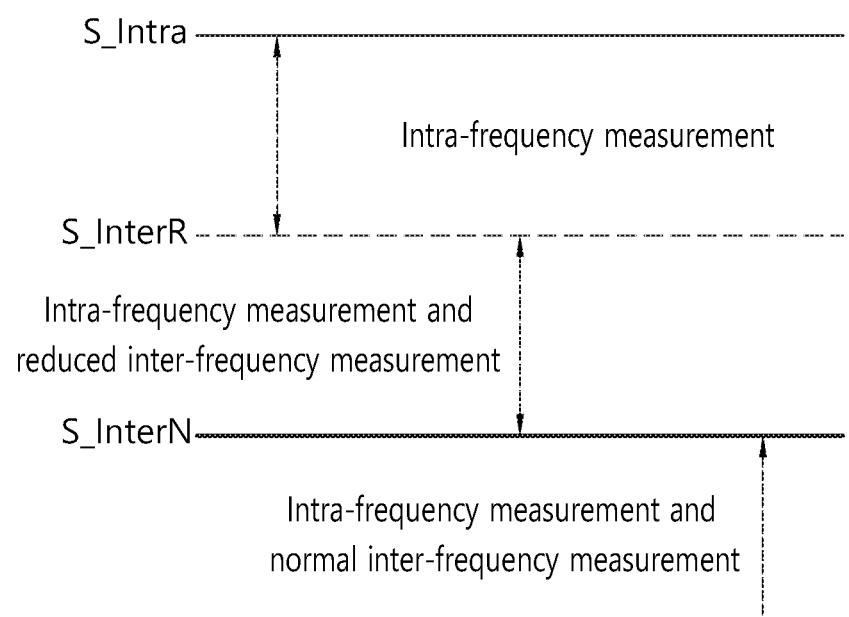
FIG. 7 shows an example of setting a plurality of threshold values according to an embodiment of the present invention.

FIG. 7 shows an example of setting a plurality of threshold values according to an embodiment of the present invention.

Referring to FIG. 7, S_Intra may be an intra-frequency measurement threshold value. S_InterR may be an inter-frequency measurement threshold value for a reduced performance measure group. S_InterN may be an inter-frequency measurement threshold value for a normal performance measure group. S may be the signal level of a serving cell. S_Intra may be greater than S_InterR. S_InterR may be greater than S_InterN.

When the signal level (S) of the serving cell measured by a UE is equal to or greater than S_Intra, the UE may not perform intra-frequency measurement and inter-frequency measurement. When the signal level (S) of the serving cell measured by the UE is smaller than S_Intra but is greater than S_InterR, the UE may need to perform intra-frequency measurement. When the signal level (S) of the serving cell measured by the UE is smaller than S_InterR but is greater than S_InterN, the UE may need to perform intra-frequency measurement and inter-frequency measurement for a reduced performance measurement group. When the signal level (S) of the serving cell measured by the UE is smaller than S_InterN, the UE may need to perform intra-frequency measurement and inter-frequency measurement for a normal performance measurement group. The UE may be an MTC UE. The measured signal level (S) of the serving cell may be at least any one of the measured power of the serving cell and the measured quality of the serving cell. For example, the measured power of the serving cell may be RSRP. For example, the measured quality of the serving cell may be RSRQ.

Figure 8:
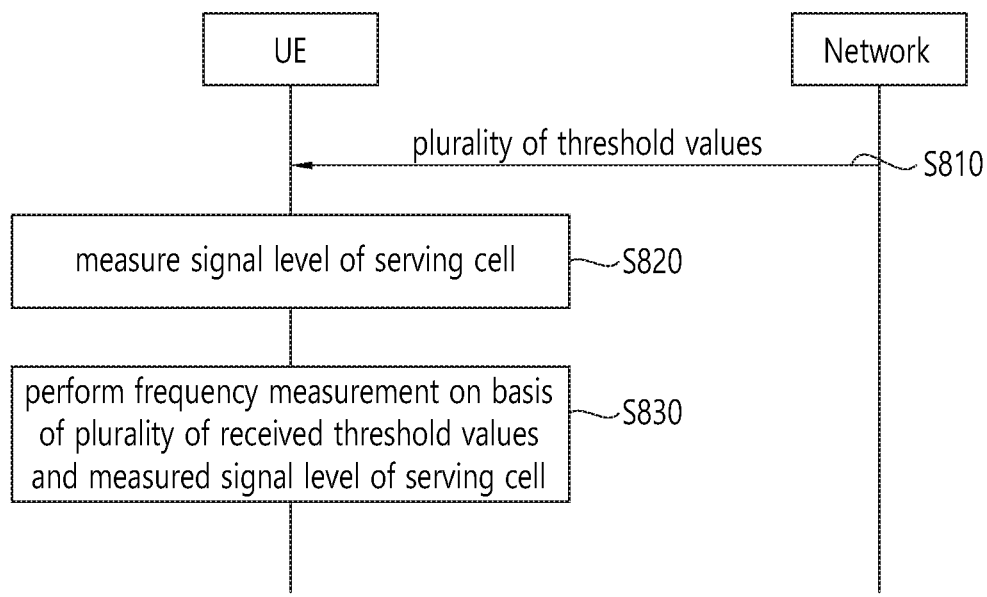
FIG. 8 shows a method in which a UE performs frequency measurement on the basis of a plurality of threshold values according to an embodiment of the present invention.

FIG. 8 shows a method in which a UE performs frequency measurement on the basis of a plurality of threshold values measurement according to an embodiment of the present invention.

Referring to FIG. 8, in step S810, the UE may receive a plurality of threshold values from a network. The UE may store the plurality of received threshold values.

The plurality of threshold values may be threshold values used to trigger neighbor cell measurement. The plurality of threshold values may be threshold values used to trigger intra-frequency measurement and/or inter-frequency measurement. The plurality of threshold values may be received from the network through broadcast signaling. Alternatively, the plurality of threshold values may be received from the network via dedicated signaling.

The plurality of threshold values may include at least any one of a threshold value for signal power or a threshold value for signal quality. For example, the plurality of threshold values may include at least any one of an RSRP threshold value and an RSRQ threshold value.

The plurality of threshold values may include an intra-frequency measurement threshold value (S_Intra), an inter-frequency measurement threshold value (S_InterR) for a reduced performance measurement group, and an inter-frequency measurement threshold value (S_InterN) for a normal performance measurement group. In this case, the intra-frequency measurement threshold value (S_Intra) may be greater than the inter-frequency measurement threshold value (S_InterR) for the reduced performance measurement group, and the inter-frequency measurement threshold value (S_InterR) for the reduced performance measurement group may be greater than the inter-frequency measurement threshold value (S_InterN) for the normal performance measurement group.

The plurality of threshold values may include an intra-frequency measurement threshold value (S_Intra) and an inter-frequency measurement threshold value (S_InterR) for a reduced performance measurement group. In this case, the intra-frequency measurement threshold value (S_Intra) may be greater than the inter-frequency measurement threshold value (S_InterR) for the reduced performance measurement group.

The UE may be an MTC UE. When an intra-frequency measurement threshold value and an inter-frequency measurement threshold value are set for the MTC UE, the MTC UE may consider the inter-frequency measurement threshold value as an inter-frequency measurement threshold value (S_InterR) for a reduced performance measurement group.

In step S820, the UE may measure the signal level (S) of a serving cell. The signal level (S) of the serving cell may be at least any one of the power of the serving cell and the quality of the serving cell. For example, the power of the serving cell may be RSRP. For example, the quality of the serving cell may be RSRQ.

In step S830, the UE may perform frequency measurement on the basis of the plurality of received threshold values and the measured signal level (S) of the serving cell.

(1) When the plurality of threshold values includes an intra-frequency measurement threshold value (S_Intra) and an inter-frequency measurement threshold value (S_InterR) for a reduced performance measurement group, the UE may perform frequency measurement as shown in Table 2.

TABLE 2

| Condition | UE behavior |
|---|---|
| S ≥ S_Intra | Not perform neighbor cell measurement |
| S_Intra > S ≥ S_InterR | Perform intra-frequency measurement |
| S_InterR > S | Perform intra-frequency measurement Consider inter-frequency carrier as carrier belonging to reduced performance measurement group, and perform inter-frequency measurement for reduced performance measurement group. That is, perform reduced inter-frequency measurement |

(2) When the plurality of threshold values includes an intra-frequency measurement threshold value (S_Intra), an inter-frequency measurement threshold value (S_InterR) for a reduced performance measurement group, and an inter-frequency measurement threshold value (S_InterN) for a normal performance measurement group, the UE may perform frequency measurement as shown in Table 3.

TABLE 3

| Condition | UE behavior |
|---|---|
| S ≥ S_Intra | Not perform neighbor cell measurement |
| S_Intra > S ≥ S_InterR | Perform intra-frequency measurement |
| S_InterR > S ≥ | Perform intra-frequency measurement |

TABLE 3-continued

| Condition | UE behavior |
|---|---|
| S_InterN | Consider inter-frequency carrier as carrier belonging to reduced performance measurement group, and perform inter-frequency measurement for reduced performance measurement group. That is, perform reduced inter-frequency measurement |
| S_InterN > S | Perform intra-frequency measurement Consider inter-frequency carrier as carrier belonging to normal performance measurement group, and perform inter-frequency measurement for normal performance measurement group. That is, perform normal inter-frequency measurement |

Figure 9:
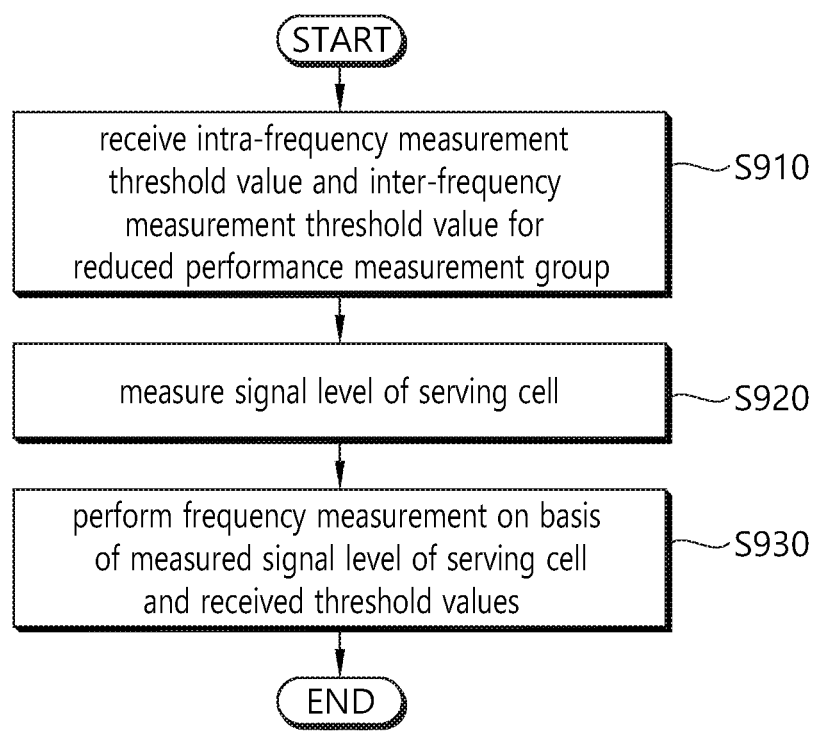
FIG. 9 is a block diagram illustrating a method in which a UE performs frequency measurement according to an embodiment of the present invention.

FIG. 9 is a block diagram illustrating a method in which a UE performs frequency measurement according to an embodiment of the present invention.

In step S910, the UE may receive an intra-frequency measurement threshold value and an inter-frequency measurement threshold value for a reduced performance measurement group. The intra-frequency measurement threshold value may be greater than the inter-frequency measurement threshold value for the reduced performance measurement group. The UE may be an MTC UE.

In step S920, the UE may measure the signal level of a serving cell. The signal level of the serving cell may be at least any one of the power of the serving cell and the quality of the serving cell.

In step S930, the UE may perform frequency measurement on the basis of the measured signal level of the serving cell and the received threshold values.

When the measured signal level of the serving cell is smaller than the inter-frequency measurement threshold value for the reduced performance measurement group, the frequency measurement may be reduced inter-frequency measurement. The reduced inter-frequency measurement may require a smaller number of samplings for frequency measurement than normal inter-frequency measurement.

The UE may receive an inter-frequency measurement threshold value for a normal performance measurement group. The inter-frequency measurement threshold value for the reduced performance measurement group may be greater than the inter-frequency measurement threshold value for the normal performance measurement group.

When the measured signal level of the serving cell is smaller than the inter-frequency measurement threshold value for the reduced performance measurement group and is greater than the inter-frequency measurement threshold value for the normal performance measurement group, the frequency measurement may be reduced inter-frequency measurement. The reduced inter-frequency measurement may have fewer inter-frequency carriers to be monitored than normal inter-frequency measurement.

When the measured signal level of the serving cell is smaller than the inter-frequency measurement threshold value for the normal performance measurement group, the frequency measurement may be normal inter-frequency measurement.

The intra-frequency measurement threshold value and the inter-frequency measurement threshold value for the reduced performance measurement group may be broadcast from a network.

Figure 10:
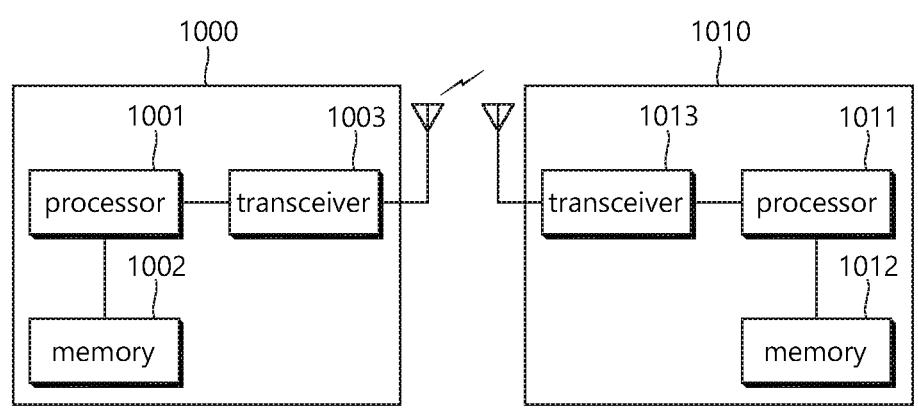
FIG. 10 is a block diagram illustrating a wireless communication system according to the embodiment of the present invention.

FIG. 10 is a block diagram illustrating a wireless communication system according to the embodiment of the present invention.

A BS 1000 includes a processor 1001, a memory 1002 and a transceiver 1003. The memory 1002 is connected to the processor 1001, and stores various information for driving the processor 1001. The transceiver 1003 is connected to the processor 1001, and transmits and/or receives radio signals. The processor 1001 implements proposed functions, processes and/or methods. In the above embodiment, an operation of the base station may be implemented by the processor 1001.

A UE 1010 includes a processor 1011, a memory 1012 and a transceiver 1013. The memory 1012 is connected to the processor 1011, and stores various information for driving the processor 1011. The transceiver 1013 is connected to the processor 1011, and transmits and/or receives radio signals. The processor 1011 implements proposed functions, processes and/or methods. In the above embodiment, an operation of the UE may be implemented by the processor 1011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), frequency measurement in a wireless communication system, the method comprising:
receiving an intra-frequency measurement threshold value and an inter-frequency measurement threshold value for a reduced performance measurement group;
receiving an inter-frequency measurement threshold value for a normal performance measurement group;
measuring a signal level of a serving cell; and performing frequency measurement based on the measured signal level of the serving cell and the received threshold values,
wherein the intra-frequency measurement threshold value is greater than the inter-frequency measurement threshold value for the reduced performance measurement group, and
wherein the inter-frequency measurement threshold value for the reduced performance measurement group is greater than the inter-frequency measurement threshold value for the normal performance measurement group.

2. The method of claim 1, wherein based on the measured signal level of the serving cell being smaller than the inter-frequency measurement threshold value for the reduced performance measurement group, the frequency measurement is reduced inter-frequency measurement.

3. The method of claim 2, wherein the reduced inter-frequency measurement requires a smaller number of samplings for frequency measurement than normal inter-frequency measurement.

4. The method of claim 1, wherein the signal level of the serving cell is at least one of a power of the serving cell or a quality of the serving cell.

5. The method of claim 1, wherein the UE is a machine-type communication (MTC) UE.

6. The method of claim 1, wherein based on the measured signal level of the serving cell being smaller than the inter-frequency measurement threshold value for the reduced performance measurement group and being greater than the inter-frequency measurement threshold value for the normal performance measurement group, the frequency measurement is reduced inter-frequency measurement.

7. The method of claim 6, wherein the reduced inter-frequency measurement requires a smaller number of samplings for frequency measurement than normal inter-frequency measurement.

8. The method of claim 1, wherein based on the measured signal level of the serving cell being smaller than the inter-frequency measurement threshold value for the normal performance measurement group, the frequency measurement is normal inter-frequency measurement.

9. The method of claim 1, wherein the intra-frequency measurement threshold value and the inter-frequency measurement threshold value for the reduced performance measurement group are broadcast from a network.

10. A user equipment (UE) for performing frequency measurement in a wireless communication system, the UE comprising:
a memory;
a transceiver; and
a processor to connect the memory and the transceiver, wherein the processor is configured to:
control the transceiver to receive an intra-frequency measurement threshold value and an inter-frequency measurement threshold value for a reduced performance measurement group;
control the transceiver to receive an inter-frequency measurement threshold value for a normal performance measurement group;
measure a signal level of a serving cell; and
perform frequency measurement based on the measured signal level of the serving cell and the received threshold values,
wherein the intra-frequency measurement threshold value is greater than the inter-frequency measurement threshold value for the reduced performance measurement group, and
wherein the inter-frequency measurement threshold value for the reduced performance measurement group is greater than the inter-frequency measurement threshold value for the normal performance measurement group.

11. The UE of claim 10, wherein based on the measured signal level of the serving cell being smaller than the inter-frequency measurement threshold value for the reduced performance measurement group, the frequency measurement is reduced inter-frequency measurement.

12. The UE of claim 10, wherein the UE is a machine-type communication (MTC) UE.

13. The UE of claim 10, wherein based on the measured signal level of the serving cell being smaller than the inter-frequency measurement threshold value for the reduced performance measurement group and being greater than the inter-frequency measurement threshold value for the normal performance measurement group, the frequency measurement is reduced inter-frequency measurement.

* * * * *